Patented Jan. 22, 1935

1,989,004

UNITED STATES PATENT OFFICE 1,989,004

PURIFICATION OF GASES

Harvey R. Fife, Pittsburgh, Pa., assignor to Carbide and Carbon Chemicals Corporation, a corporation of New York No Drawing. Application May 20, 1931,
Serial No. 538,886

11 Claims. (Cl. 23—2)

The invention is a process for purifying gases, and especially for removing sulfur compounds from industrial gases. The process broadly comprises scrubbing the gaseous mixture containing the impurities with a scrubbing medium containing an ethanolamine or a mixture of ethanolamines and containing dissolved or suspended oxides, hydroxides or salts of certain metals.

Many industrial gases contain impurities which must be removed before the gases are suitable for certain uses. Organic and inorganic sulfur compounds are commonly present in gases, and most gas purification systems are designed for the removal of these impurities. One of the most disadvantageous features of previously known processes for purifying gases is the fact that more than one treatment or type of treatment is necessary to remove both organic and inorganic sulfur compounds from the gases.

The present invention provides a means for simultaneously removing both organic and inorganic sulfur compounds, and its advantages will be apparent. The process of this invention is adapted for removing other deleterious substances from gases, for example phosphorus compounds.

The process may be operated with mono, di or triethanolamine in combination with a suitable metallic oxide, hydroxide or salt. The ethanolamines, as commercially produced, are not pure. The commercial product contains a mixture of all three amines, and such mixtures are well adapted to my process, a preferred mixture contains about equal parts of mono, di and triethanolamine. The metals which are suitable for use in my process are, in general, any metal forming oxides, hydroxides or salts which are soluble in solutions of ethanolamines, ethanolamine salts or mixtures of ethanolamines with ethanolamine salts, and from which solutions the metallic sulfide may totally or partially be precipitated with ease. Copper, iron, nickel and zinc are examples of such metals. The metal may be present in the solution in the form in which it is added or it may exist as an ethanolamine-metal complex salt.

The process of my invention may be operated as a continuous cycle. In one portion of the cycle the gas is scrubbed with a solution of a mixture of ethanolamines containing a metallic salt. In another portion of the cycle the scrubbing solution is aerated either continuously or intermittently. The cycle may be varied by introducing operations for supplying additional metal salt to the solution, regenerating the ethanolamines from their sulfur salts, or maintaining the concentration of the solution.

The proportions of ethanolamine and metal present in the scrubbing medium of the process may vary. The choice of the proportions in each case is dependent upon the particular ethanolamine or ethanolamine mixture and upon the metal which is to be used. The choice is also dependent upon the type of scrubbing equipment, and upon the nature of the gas to be purified. In some instances, concentrated ethanolamine solutions are preferred in order to float suspended metallic sulfides; in other cases more dilute solutions are suitable.

In the scrubbing operation, the sulfur compounds are absorbed by the solution, the metallic salt and ethanolamines being mutually active in the absorption. A portion of the sulfur compounds in the gas probably combines with the ethanolamines while another portion forms sulfur salts with the metal which is present. This is believed to be true of both organic and inorganic sulfur impurities. In the aeration operation, the sulfur salts of the ethanolamines and metal are apparently oxidized or otherwise converted to soluble salts. The total change produced by aeration is not definitely known. Metallic sulfides are probably oxidized to sulfites which react with sulfur or hydrogen sulfide to form thiosulfates, or which react with oxygen to form sulfates. Sulfites, sulfates, and thiosulfates have been recognized and it is also probable that other oxidation reactions occur. The same is probably true of ethanolamine sulfur salts, also it is probable that some ethanolamine sulfur compounds increase the solubility of certain metallic oxides, hydroxides and salts; they also increase the solubility of organic sulfur compounds and thus assist in causing the precipitation of metallic sulfides formed from the organic sulfur compounds.

When the solution has become saturated with ethanolamine-sulfur salts, the solution is treated to remove the absorbed sulfur and to regenerate a corresponding portion of available ethanolamines, including free ethanolamines and weak ethanolamine salts, such as the carbonates. The regeneration treatment comprises agitating the solution with lime. The solution is then filtered and is ready for further use in the scrubbing operation.

The process may be varied by using a solution of ethanolamines, ethanolamine-sulfur salts, or mixtures thereof containing and continuously supplied with a soluble metal salt, and from which metallic sulfides are continuously removed. The sulfur is absorbed and precipitated as a metallic sulfide which may be discarded or reconverted into a soluble metal salt and resupplied to the solution. A convenient method of introducing the metal salt into the solution is to permit the solution to flow over scrap metal which has been oxidized in the air. The solution dissolves the oxide and is thus supplied with the metallic salt. Copper turnings constitute a satisfactory and economical material for this purpose.

The following examples are illustrative of the invention.

I. A raw gas, containing traces of hydrogen sulfide and from 4 to 7 grains of organic sulfur compounds per 100 cubic feet, was treated in standard gas scrubbing equipment with an ethanolamine solution containing 26% to 31% by weight of mixed ethanolamines and about 0.13% by weight of nickel as a soluble salt. The nickel is added as nickel sulfate, but probably exists in the solution as a complex ethanolamine salt the exact nature of which is not known. The solution was circulated at the rate of about 1200 to 1400 gallons per hour and a gas rate of 2 to 3 million feet per day was maintained. The total volume of solution in the system was about 1000 to 1200 gallons. The traces of hydrogen sulfide were removed and the organic sulfur compounds were reduced to 0 to 2 grains per 100 cubic feet of gas. The solution was continuously aerated during the operation. The amount of sulfur removed is a function of the contact between the gas and the absorbing medium.

II. A total of 5 million cubic feet of raw gas was scrubbed per 24 hours in the manner described in Example I. The scrubbing solution contained 15% to 30% by weight of total mixed ethanolamines, and from 0.004% to 0.393% by weight of nickel. The raw gas contained from 2 to 4 grains of organic sulfur compounds and from 8 to 14 grains of hydrogen sulfide per 100 cubic feet. The purified gas contained from 0 to 1 grain of organic sulfur compounds and from 0 to 4 grains of hydrogen sulfide per 100 cubic feet. The rate of circulation of the scrubbing solution was 1200 to 1400 gallons per hour, and the total volume of solution in the system was about 1000 to 1200 gallons.

The step of regenerating the ethanolamines which are combined with sulfur comprises a simple treatment with lime. For example, the solution of Example II containing from 15% to 30% by weight of mixed ethanolamines (of which 2.86% were uncombined with sulfur) was agitated with hydrated lime. The excess lime and the calcium-sulfur compounds which precipitated were removed by filtration. After this treatment the solution was found to contain from 10% to 13% of free and available ethanolamines.

A modified form of the invention may be applied in the same manner as the process described in the examples, with the provision of means for continuously introducing an additional supply of metallic salt into the solution and means for continuously removing the metallic sulfides which are precipitated.

If the process is applied to gases of high moisture content there is a tendency for the solution to become diluted by absorbing moisture from the gas. This tendency may be combated by heating the solution in any convenient manner and distilling off enough water to maintain the desired concentration. I prefer to apply this concentrating treatment, when necessary, before the solution is treated with lime. Heating the solution apparently converts some of the sulfur salts to a form which is more easily precipitated with lime, hence, it assists in regenerating the ethanolamines.

The process may be applied in the manner described herein for the removal of phosphorus compounds from gases. For example, phosphene may be removed, and in this case the metallic phosphide is precipitated and removed in the lime treatment.

Many other variations of the process are possible and are included within my invention, as defined by the appended claims.

I claim:—

1. A process for removing impurities from gases, which comprises scrubbing the gas with a solution containing an ethanolamine and a metallic compound.

2. A process for removing impurities from gases, which comprises scrubbing the gas with a solution containing an ethanolamine and a metallic compound, and thereafter treating the solution to regenerate available ethanolamine therein.

3. A process for removing impurities from gases, which comprises scrubbing the gas with a solution containing an ethanolamine and a metallic compound, said compound being soluble in solutions of ethanolamines and ethanolamine salts and from which solutions the metallic sulfide can be precipitated.

4. A process for removing impurities, including sulfur compounds, from gases, which comprises scrubbing the gas with a solution of an ethanolamine containing a compound of a metal of the group consisting of copper, iron, nickel, and zinc.

5. A process for removing impurities, including sulfur compounds, from gases, which comprises scrubbing the gas with a solution containing from about 15% to about 30% by weight of an ethanolamine and not more than about 1% by weight of nickel.

6. A cyclic process for removing impurities, including sulfur compounds, from gases, which comprises scrubbing the gas in one portion of the cycle with a solution containing about 15% to 30% by weight of a mixture of ethanolamines, and containing not more than about 1% by weight of nickel, aerating the solution in another portion of the cycle, and treating the solution with lime in a third portion of the cycle to remove absorbed sulfur and regenerate free ethanolamines.

7. A process for removing impurities, including both inorganic and organic sulfur compounds simultaneously, from gases, which comprises scrubbing the gas with a solution containing an ethanolamine and a metallic compound.

8. A process for removing impurities, including both inorganic and organic sulfur compounds simultaneously, from gases, which comprises scrubbing the gas with a solution containing an ethanolamine and a metallic compound, said compound being soluble in solutions of ethanolamine and ethanolamine salts and from which solutions the metallic sulfide can be precipitated.

9. A process for removing impurities, including both organic and inorganic sulfur compounds simultaneously, from gases, which comprises scrubbing the gas with a solution of an ethanolamine containing a compound of a metal of the group consisting of copper, iron, nickel, and zinc.

10. A process for removing impurities, including both organic and inorganic sulfur compounds simultaneously, from gases, which comprises scrubbing the gas with a solution containing from about 15% to about 30% by weight of an ethanolamine and not more than about 1% by weight of nickel.

11. A cyclic process for removing impurities, including both organic and inorganic sulfur compounds simultaneously, from gases, which comprises scrubbing the gas in one portion of the cycle with a solution containing about 15% to 30% by weight of a mixture of ethanolamines, and containing not more than about 1% by weight of nickel, aerating the solution in another portion of the cycle, and treating the solution with lime in a third portion of the cycle to remove absorbed sulfur and regenerate free ethanolamines.

HARVEY R. FIFE.